US005609717A

United States Patent [19]

Pascale et al.

[11] Patent Number: 5,609,717

[45] Date of Patent: Mar. 11, 1997

[54] APPARATUS FOR MANUFACTURE OF INSULATING GLASS FOR AUTOMOBILES

[75] Inventors: Carmine Pascale; Pietro Aresu, both of Vasto, Italy

[73] Assignee: Societa Italiana Vetro -SIV - S.p.A., San Salvo, Italy

[21] Appl. No.: 267,394

[22] Filed: Jun. 29, 1994

[30] Foreign Application Priority Data

Jun. 30, 1993 [IT] Italy ................................ RM93A0428

[51] Int. Cl.[6] .......................... B32B 31/12; B29C 65/52; B65G 25/04; B65H 37/04

[52] U.S. Cl. .......................... 156/556; 156/109; 156/553; 156/578; 198/468.4; 198/379; 414/627; 414/752; 414/763

[58] Field of Search .................................... 156/107, 109, 156/538, 556, 578, 553, 358; 198/471.1, 468.4; 414/627, 737, 758

[56] References Cited

U.S. PATENT DOCUMENTS

| | | | |
|---|---|---|---|
| 4,366,013 | 12/1982 | Valimont et al. | 156/102 |
| 4,458,628 | 7/1984 | Fujii et al. | 118/697 |

FOREIGN PATENT DOCUMENTS

| | | |
|---|---|---|
| 0437418 | 7/1991 | European Pat. Off. . |
| 2315673 | 10/1974 | Germany . |
| 2352835 | 5/1975 | Germany . |
| 3728284 | 4/1989 | Germany . |
| 3935992 | 5/1991 | Germany . |
| 4106958 | 9/1992 | Germany . |

*Primary Examiner*—Michael W. Ball
*Assistant Examiner*—Francis J. Lorin
*Attorney, Agent, or Firm*—Wenderoth, Lind & Ponack

[57] ABSTRACT

An apparatus for the manufacture of curved insulating glass, for use on automobiles, is made providing separate paths for the two sheets of glass making up the insulating double-glazed glass, until an assembly station (M) is reached. Two separate centering stations (D and D1) are also provided. The apparatus has, in the single assembly station (M), a pressing device to press the insulating glass (V) until the desired thickness is obtained.

7 Claims, 7 Drawing Sheets

APPARATUS FOR MANUFACTURE OF INSULATING GLASS FOR AUTOMOBILES

BACKGROUND OF THE INVENTION

1. Field of the Invention

The present invention relates to an apparatus for manufacture of curved insulating glass, particularly suited for use as windscreens in automobiles.

2. Description of the Prior Art

The insulating glass is made up of two sheets of monolithic glass, separated by an interspace containing dehydrated air, held apart by spacers of aluminium or plastic material, containing hygroscopic salts and sealed at the edges using suitable materials. In recent times this type of glass has become more and more widely used in the field of car windscreens, preferably to replace the traditional monolithic tempered windscreens.

When applied to cars, the sheets of monolithic glass forming the insulating glass are also tempered, for safety reasons.

Manufacture on an industrial level of this type of product for the car industry gives rise to problems relating to cost and quality.

SUMMARY OF THE INVENTION

Object of the present invention is therefore to provide an apparatus capable of manufacturing curved insulating glass, providing a quality level suitable to be accepted by the market, and with restricted manufacturing costs.

The above advantages can be obtained using a highly automated apparatus, which does not require manual intervention except during the stages upstream and downstream of the apparatus itself.

The automatic handling of the glass itself takes place without in any way touching the surfaces destined to form the inside of the insulating glass, so as to reduce to a minimum the risk of rejects due to marks or finger prints on the inner surfaces.

Automation of the whole manufacturing cycle also allows repetition of operations, thus guaranteeing a high level of quality in the finished product.

An object of the present invention is therefore an apparatus for the manufacture of curved insulating glasses for use as windows in automobiles, including stations for loading, centering, butyl rubber application, assembly, adjustment of thickness and unloading. The apparatus includes a first transport line for internal glass with a first carrier moving between an internal glass loading station and a first internal glass centering and butyl rubber application station. The apparatus also includes second transport line for external glass with a second carrier moving between a first position, in which the carrier engages with an external glass in the loading station and another external glass in a second centering station, and a second position, in which the carrier engages with an external glass in the second entering station and an external glass in an assembly and thickness adjustment station. Further, the apparatus includes third transport line connecting the first and the second transport lines and comprising a third carrier moving between a first position, in which the third carrier engages with an internal glass in the first internal glass centering and butyl rubber application center and a double glazing or composite glass assembled in the assembly and thickness adjustment station, and a second position, in which the carrier engages with the double glazing or composite glass assembled in the assembly station and an assembled composite glass in the unloading station.

BRIEF DESCRIPTION OF THE DRAWINGS

Further advantages and characteristics of the invention will be clear from the following description, given as a non-limiting example with reference to the enclosed drawings, in which.

BRIEF DESCRIPTION OF THE PREFERRED EMBODIMENT

Figure 1:
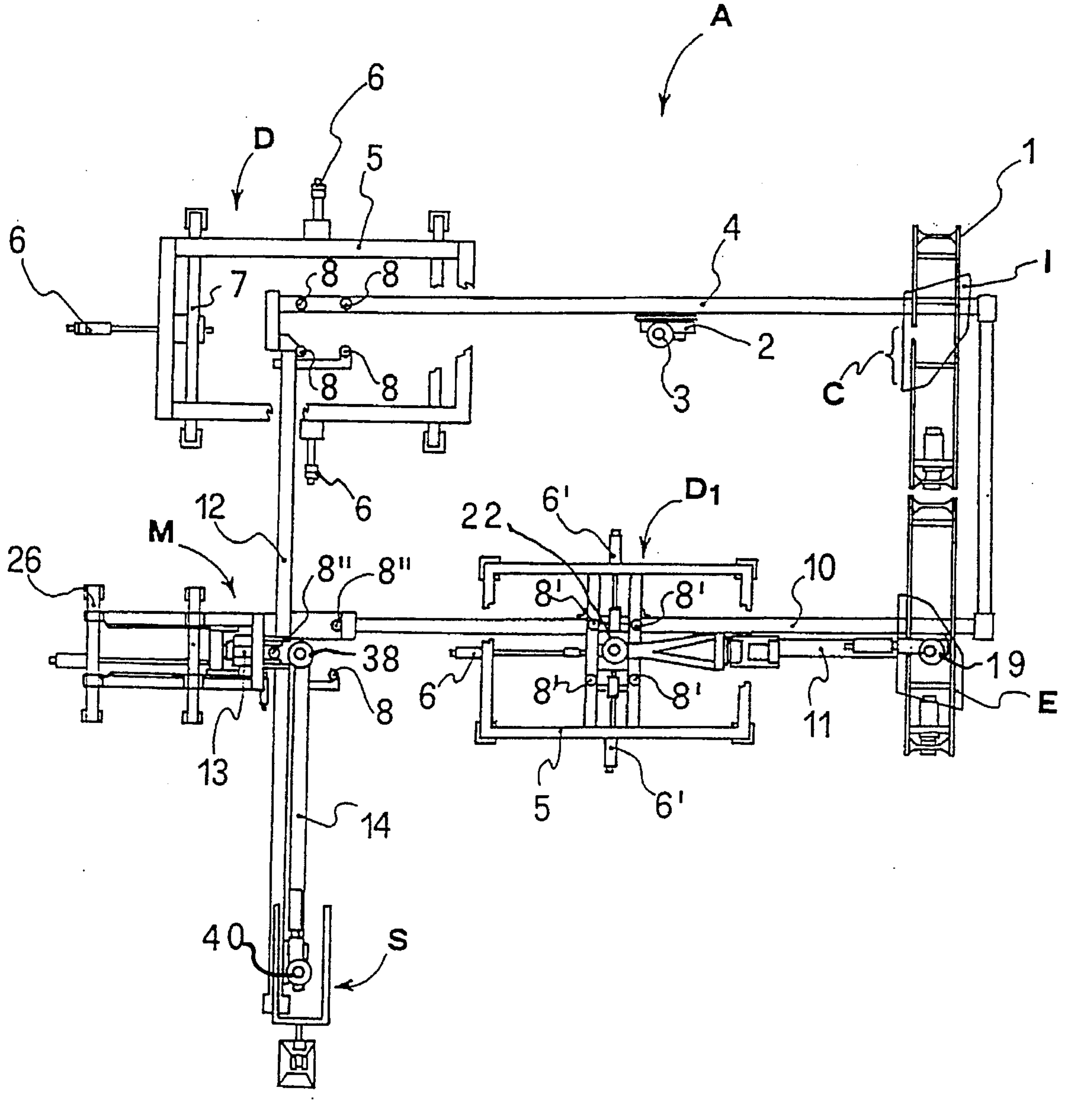
FIG. 1 is a plan view from above of the apparatus according to the present invention.
Figure 2:
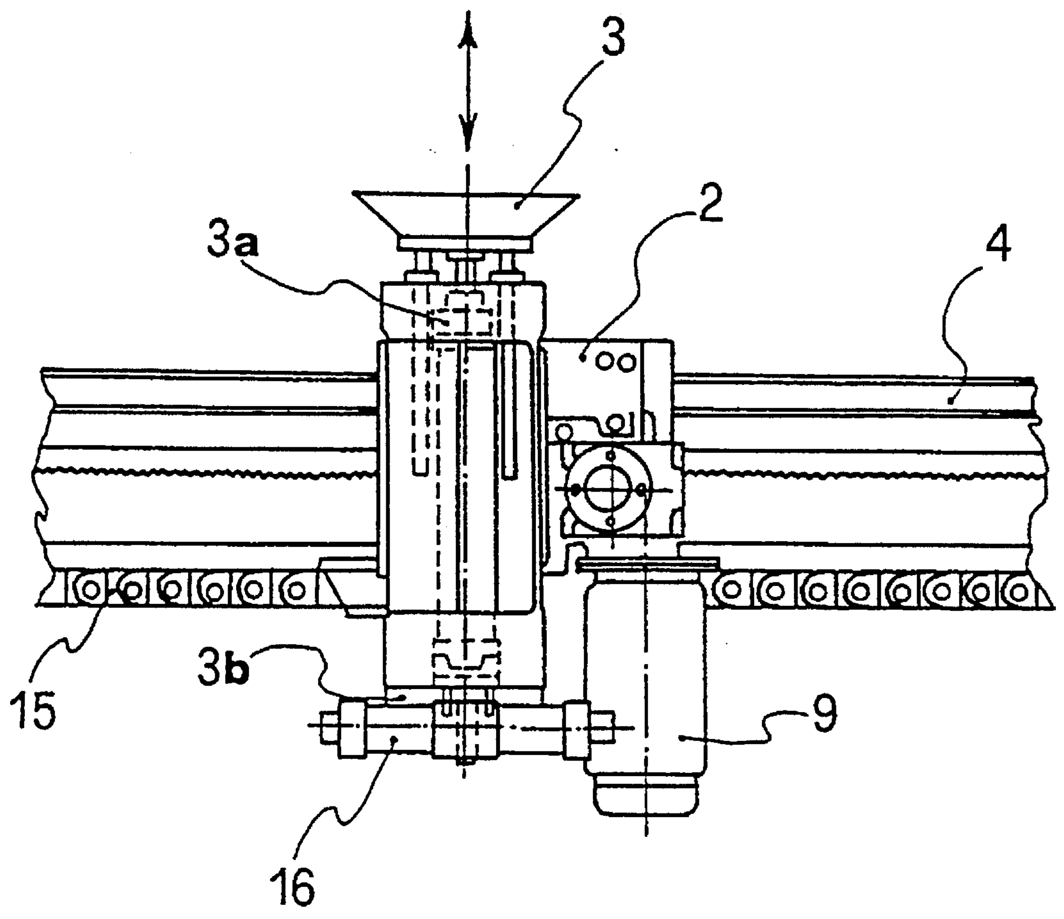
FIG. 2 is a side view of the carrier for transport of internal glass.
Figure 3:
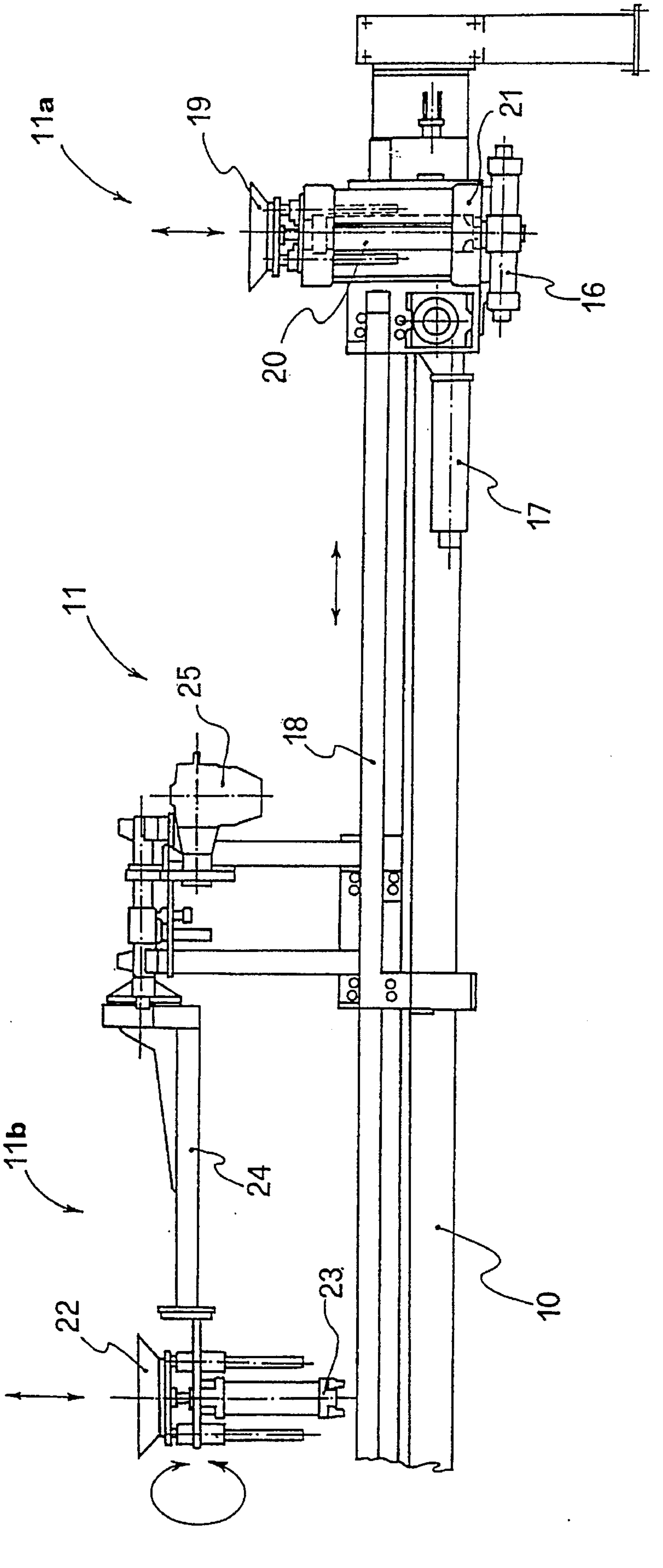
FIG. 3 is a side view of the carrier for transport of external glass.
Figure 4:
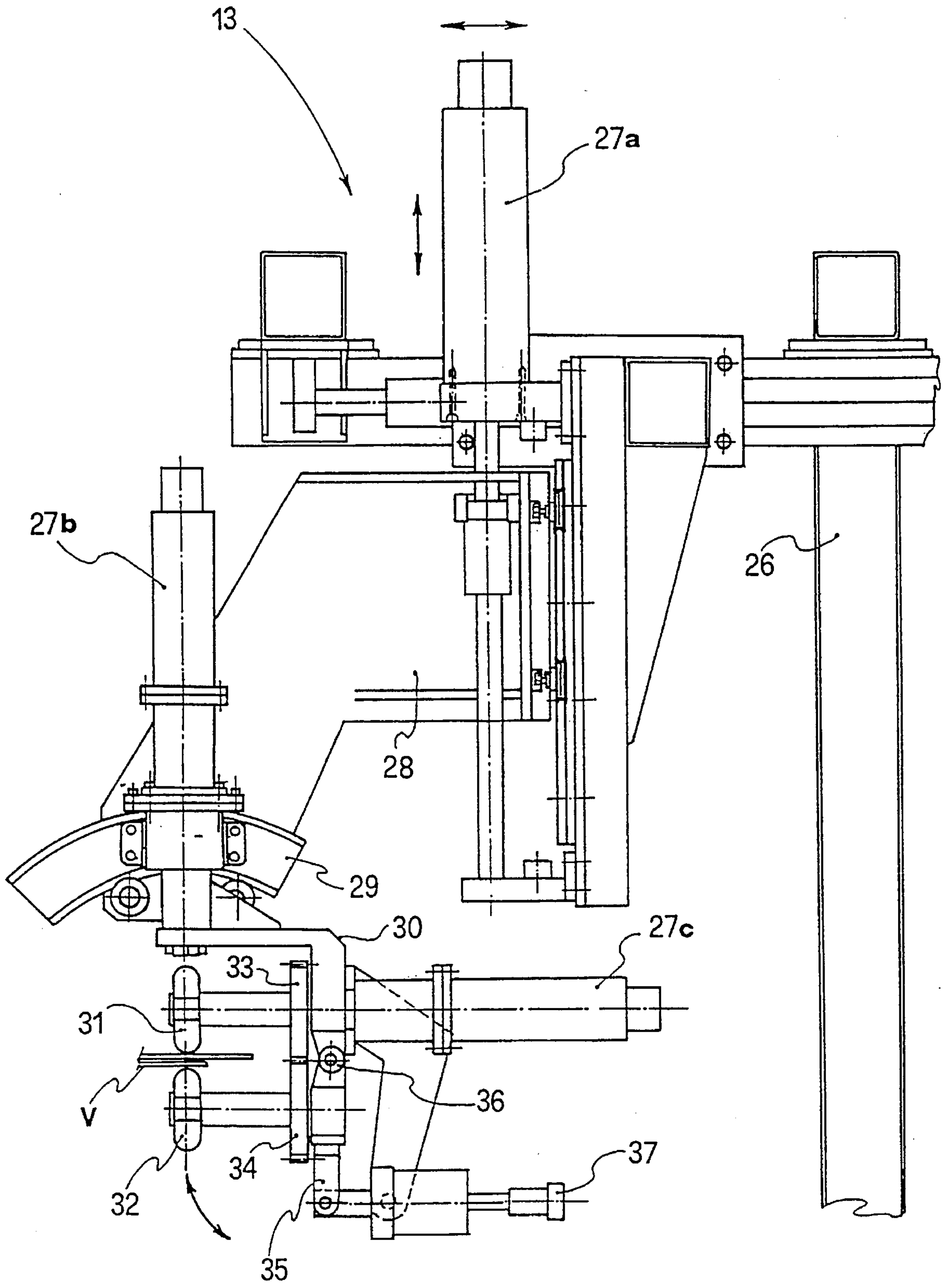
FIG. 4 is a side view of the device to adjust the thickness of the insulating glass.
Figure 5:
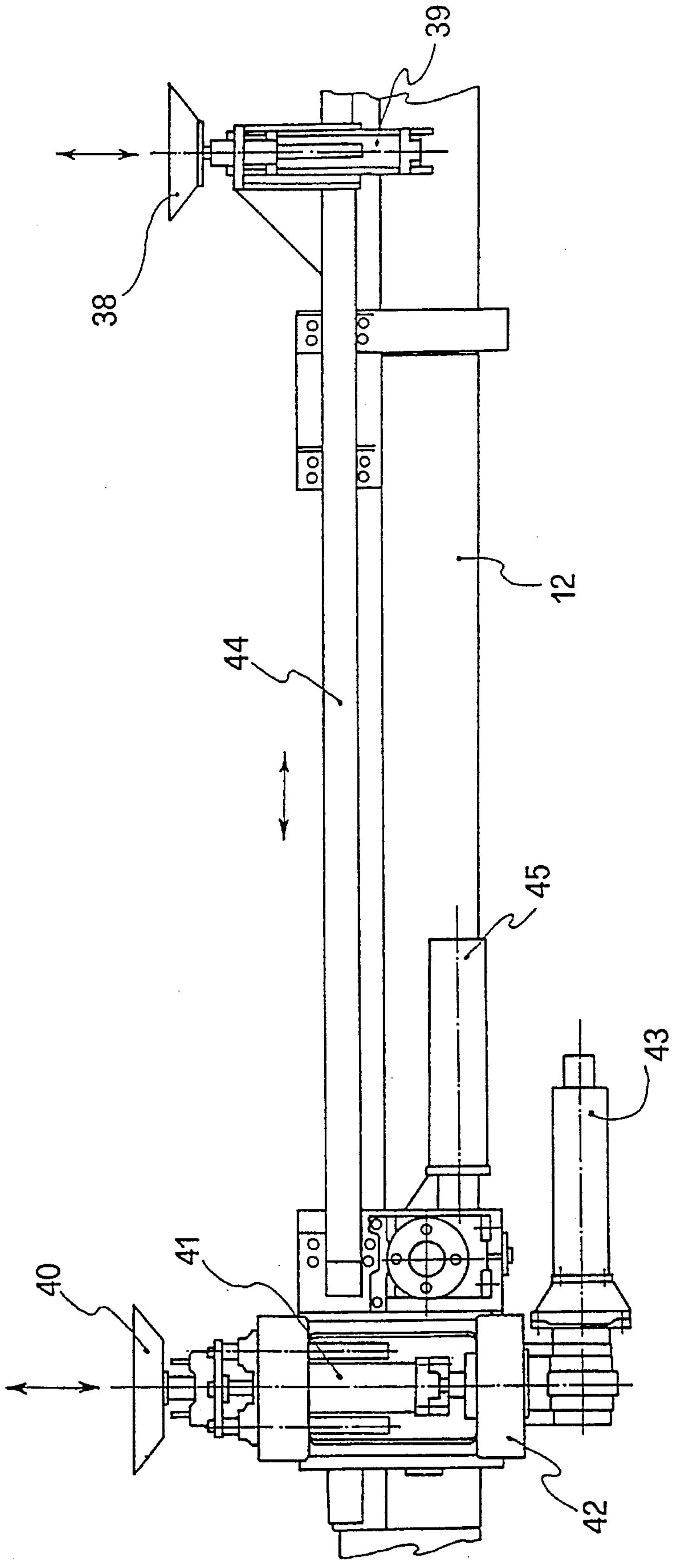
FIG. 5 is a side view of the carrier for unloading the insulating glass.

FIGS. 1 to 5 show an apparatus for the automatic manufacture of insulating glass, that is to say of a product made up of two monolithic sheets of glass separated by a dehydrated air space, held apart by a separator in the form of a bead of butyl with a circular cross-section containing hygroscopic salts.

According to the present invention the apparatus A comprises a conveyor belt 1, on which the sheets of glass to be assembled are transported, after having undergone the necessary tempering, washing and control operations.

The sheets of glass are divided into internal sheets I and external sheets E, because in the application of insulating glass, in particular on automobiles, the external sheet has a larger perimeter than the internal sheet. Naturally, the two sheets of glass can also have the same perimeter.

In the apparatus object of the present invention the internal sheet of glass I and the external sheet of glass E follow two distinct routes, which come together only from the assembly station onwards.

With reference to the route followed by the internal sheet of glass I, a transport carrier 2, provided with a suction cup device 3 to hold the glass, is positioned along the conveyor belt 1 in the loading area C, in a position underlying the sheet of glass I. The carrier 2 moves along the rail transport line 4 connecting the loading area C for the internal sheet of glass I horizontally with a device D centering the glass I, positioned in a first centering station.

The centering device D has a frame 5 supporting the actuators 6 that supply horizontal motion to suitable bumpers, not illustrated in the figure, which center the sheet of glass I with respect to the machine's ideal reference center.

Inside the centering device D is a device 7, for extruding suitable plastic material, preferably butyl containing hygroscopic salts, with a circular cross-section, onto the edge of the internal sheet of glass I.

In the centering and butyl rubber application center D there are a suitable number of adjustable push rods 8, capable of a vertical movement to lift the sheet of glass I and detach it from the suction cup 3. From the conveyor belt 1 and in a position following the rail 4, at a suitable distance therefrom, a second transport line or second rail 10 departs, joining the conveyor belt 1 to a second centering station D1 and, continuing in a straight line, to a pressing and thickness adjustment station M.

A horizontally moving transport carrier 11 is connected to the rail 10.

The carrier transfers the external sheet of glass E from the conveyor belt 1 to the thickness adjustment station M, after passage through the centering station D1.

The centering station D1 is made in a similar way to the centering station D, that is to say it has centering actuators 6' and vertically moving support push rods 8'.

A third transport line or rail 12 connects horizontally and in a straight line the first centering station D for the internal sheet of glass I to the thickness adjustment station M and to the unloading station S.

The thickness adjustment station M has vertically moving push rods 8" to support the insulating glass formed by the internal sheet of glass I and the external sheet of glass E, and a pressing and thickness adjustment device 13.

The rail 12 acts as a support and guide for a transfer and unloading carrier 14.

The carrier 2 conveying the internal sheets of glass I is put into motion by a motor reduction unit, by means of a chain 15. A suction cup 3, which can move in a vertical direction, is connected to the body of the carrier 2. The pneumatic cylinder **3*a* to lift the suction cup 3 vertically is in turn connected to a circularly moving support 3*b*, to allow rotation around its vertical axis, said movement being supplied by the motor 16**.

The transfer carrier 11 for the external sheets of glass E is supported by the rail 10, along which it runs in a horizontal manner between two end positions, moved by the motor reduction unit 17 which allows translation of the whole carrier 11 thanks to a chain not illustrated in the drawing.

The carrier 11 is made up of two parts, joined together by means of a rigid bar 18.

The part **11*a* is provided with a suction cup 19, which moves vertically thanks to a pneumatic cylinder 20 connected to a support 21 moving in a circle around its own vertical axis under the motion of the actuator 16**.

The part **11*b* has a suction cup 22, sliding vertically thanks to a pneumatic cylinder 23. The horizontal bar 24 supporting the suction cup 22 is in line with the shaft of a motor reduction unit 25. The bar 24 is offset, by a suitable height, from the horizontal axis of the rail 10, so that the whole carrier 11** has a typical step-type shape, as shown in the figure.

The pressing and thickness adjustment device 13 present in the pressing station M is supported by the support frame 26 and is provided with actuators 27 so as to have six degrees of freedom; in particular the actuator **27*a* provides a first vertical movement and a second horizontal movement of plate 28. The actuator 27*b* allows rotation around the circular cross-section 29 of the support 30. The actuator 27*c* provides the pressing wheels 31 and 32 with the rotating movement around their own horizontal axis. A final actuator, not shown in the figures, provides the device 13** with its sixth degree of freedom.

The actuator **27*c* is directly connected to the press wheel 31, and transmits its motion to the wheel 32 by means of toothed wheels 33 and 34**.

The group comprising press wheel 32 and toothed wheel 34 is supported by a lever 35 hinged at 36. Said lever 35 is pushed by a piston 37. The press wheels 31 and 32 close around the insulating glass complex V, with a pressure suitable to perform the thickness adjustment operation, causing the cross-section of the butyl rubber bead to be flattened.

The transfer and unloading carrier 14 moves between two end positions and has at its extremities the suction cups 38 and 40. The suction cup 38 is connected to a pneumatic cylinder 39 which allows it to move in a vertical direction. The suction cup 40 is connected to a pneumatic cylinder 41 to give vertical movement. The pneumatic cylinder 41 rests on a support 42 which is circularly mobile around its own axis, thanks to the motion supplied by the motor 43.

The two suction cups 38 and 40 are integrally joined by means of a rigid bar 44. The carrier is provided with a motor reduction unit 45 to supply the horizontal sliding motion along rail 12, by means of a chain and suitable kinematic devices not shown in the figures.

With reference to FIGS. 6 to 17 according to the present invention, the operating diagram of the apparatus A is described herebelow.

The internal sheet of glass I and the external sheet of glass E are loaded alternately onto the conveyor belt 1 and sent for assembly, after performance of the curving, tempering, washing and control operations.

The sheet of glass I stops in correspondence with rail 4, where the suction cup 3 on carrier 2 rises and engages with it (FIG. 6), transporting it to the centering station D.

Here the sheet of glass I is lifted vertically by the push rods 8 (FIG. 7), while the carrier 2 goes back to prepare for the next load.

In the centering station the actuators 6 move the sheet of glass I on the plane until the center of the glass is brought into position over the ideal center of the machine, distributing the different dimensions of the glass in a radial manner.

Subsequently, the butyl rubber application apparatus 7 extrudes a bead of plastic material P along the edge of the sheet of glass I. The preferred material is butyl rubber and has a circular cross-section (FIG. 8).

Figures 6, 7, 8, 9, 10, 11, 12:
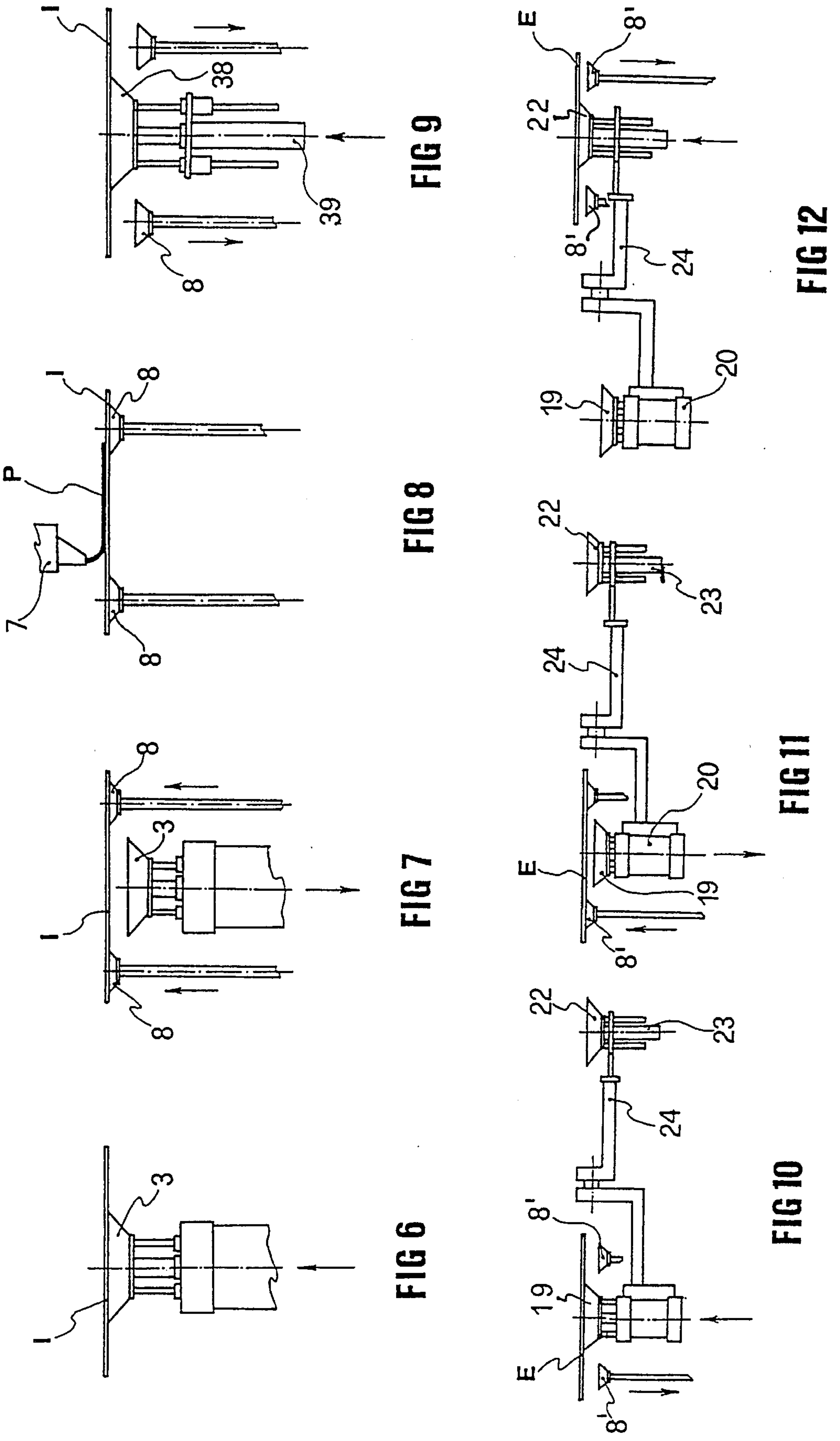
FIG. 6 shows a transport carrier in a loading area C during the step of taking up an inner glass sheet.
FIG. 7 shows the transport carrier in a centering device D during the step of delivering the inner glass sheet I to the push rods.
FIG. 8 shows the inner glass sheet I in the centering device D during the step of application of the butyl rubber.
FIG. 9 shows the inner glass sheet I in the centering device D being picked up by a suction cup of an unloading carrier.
FIG. 10 shows a transport carrier in a second position with an outer glass sheet E in a centering station D1 after having been picked up by a first suction cup, while a second suction cup is located in the pressing and thickness adjusting station M.
FIG. 11 is similar to FIG. 10 with the outer glass sheet E delivered from the suction cup to the push rods in the centering station D1.
FIG. 12 shows the transport carrier shifted to its first position with the second suction cup in the centering station D1 taking up the centered outer glass sheet E and the first suction cup located in the loading area to receive a fresh outer glass sheet E.
Figure 13:
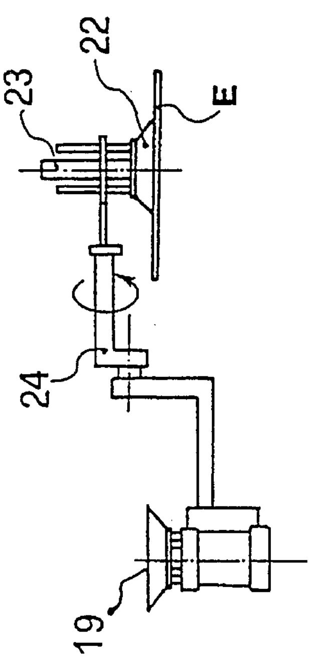
FIG. 13 shows the transfer carrier during the step of being shifted again to its second position with the second suction cup and the outer glass sheet E in position for the step in the pressing and thickness adjustment station M.

On completion of the extrusion stage, the suction cup 38 on the transfer and unloading carrier 14 engages with the sheet of glass I, while the push rods 8 lower (FIG. 9). The suction cup 38 will not disengage from the sheet of glass I until assembly of the two sheets of internal and external glass has been finally completed.

In the meantime, the external sheet of glass E has continued along the conveyor belt 1 until stopping at rail 10.

The suction cup 19 on the carrier 11 picks up the sheet of glass E and the whole carrier moves until the sheet of glass is brought to the centering station D1 (FIG. 10). The sheet of glass E is released onto push rods 8' (FIG. 11) and the actuators 6' move the sheet of glass E on the plane until its ideal center coincides with that of the machine. At the same time the carrier 11 returns to its starting position.

After centering has been completed, the suction cup 22 takes up the sheet of glass from the push rods 8', which lower (FIG. 12) and moves it forward towards the assembly station M.

During its movement between stations D1 and M the arm 24 rotates by 180° (FIG. 13), so that the sheet of glass E is perfectly in line with and overlying the sheet of glass I, which is locked into position by the suction cup 38 on the unloading carrier 14 and has reached the station M transported by the carriage 14.

Figure 14:
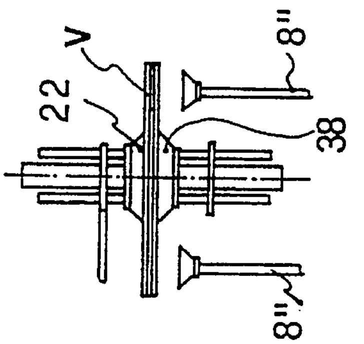
FIG. 14 shows both sheets of glass in the station M being held by the suction cup of the transfer carrier and the suction cup of the unloading carrier, respectively.
Figure 15:
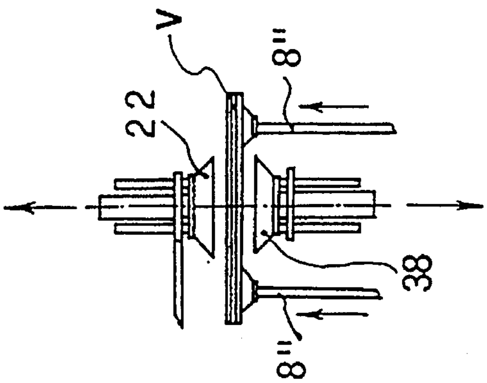
FIG. 15 shows the glass V in the station M being picked up by the push rods.

Assembly takes place by release of the external sheet of glass E by the suction cup 22 at a suitable distance from the butyl rubber bead deposited on the internal sheet of glass I (FIG. 14).

Figure 16:
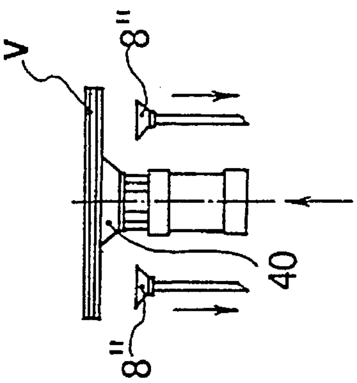
FIG. 16 shows the glass V in the station M being picked up by a suction cup of the unloading carrier.

When the two sheets of glass have been joined together, the push rods 8" in station M lift the paired glass (FIG. 15) and the suction cup 38 returns to the centering station D, while the suction cup 40 on carrier 14 positions itself under the assembled pair and proceeds to block the sheets of glass (FIG. 16).

Figure 17:
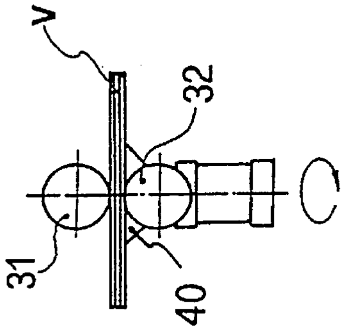
FIG. 17 shows the glass V in the station M in the step of pressing and thickness adjustment.

The pressing device 13 advances, closing wheels 31 and 32, which were open, around the edge of the complex, which is put into rotation by the suction cup 40. The wheels 31 and 32 follow the edge of the composite glass V, pressing it and adjusting its thickness by squeezing the butyl rubber bead (FIG. 17).

On completion of this stage the carrier 14 advances, bringing the glass towards the unloading station S, while another internal sheet of glass I on suction cup 38 and another sheet of external glass E on suction cup 22 are ready to be assembled.

Although the present invention has been described in the form of a preferred embodiment thereof, it is understood that variations and modifications may be made thereto without departing from the scope of the invention itself.

We claim:

1. An apparatus comprising:

a) a first station for centering internal glass sheets and applying butyl rubber;
  - a first transport line for linking an internal glass sheet loading station with said first station;
  - a first glass carrier provided on said first transport line for movement thereon;

b) a second station for centering external glass sheets;
  - a second transport line, extending substantially parallel to said first transport line, for linking an external glass sheet loading station with said second station;
  - a third station, on said second transport line, for assembling internal and external glass sheets, and for adjusting the thickness thereof;
  - a second glass carrier, having a first end and a second end, provided on said second transport line for movement between a first position at which said first end engages an external glass sheet in an external glass sheet loading station and said second end engages an external glass in said second centering station, and a second position where said first end engages an external glass sheet in said second station and said second end engages an external glass sheet in said third station;

c) a fourth station for unloading an assembled double-glazed glass;
  - a third transport line extending between said first station and said fourth station for connecting said first, third and fourth stations; and
  - a third glass carrier, having a first end and a second end, provided on said third transport line to allow movement between a first position at which said first end engages an internal glass in said first station and said second end engages a double-glazed glass to be assembled and adjusted in said third station, and a second position at which said first end engages a double-glazed glass to be assembled and adjusted in said third station and said second end engages an assembled double-glazed glass in said fourth station.

2. The apparatus as claimed in claim 1, wherein said second carrier comprises:

- a vertically movable suction cup at said first end of said second carrier for engaging an external sheet of glass in a loading station and for delivering the glass to said second station;
- a horizontal arm integrally mounted on said second end of said second carrier, said arm extending along a travel direction of said second carrier and being offset relative to said second carrier, said arm being rotatable about its longitudinal axis;
- a vertically slidable suction cup mounted on an end of said horizontal arm for engaging a centered external sheet of glass in said second station; and
- a motor reduction unit mounted on an opposite end of said horizontal arm for rotating said arm and an external glass sheet connected to said suction cup 180° to permit assembly with an internal glass sheet in said third station.

3. The apparatus as claimed in claim 1, further comprising in said third station a device provided with actuators and pressure wheels, said device having degrees of freedom which are sufficient to allow said device to follow an edge of a double-glazed glass for pressing the sheets of glass together with a butyl rubber bead therebetween to obtain a desired thickness of the double-glazed glass.

4. The apparatus as claimed in claim 1, wherein said first carrier includes a vertically movable suction cup for engaging an internal sheet of glass.

5. The apparatus as claimed in claim 4, wherein said first station includes a plurality of vertically moving push rods provided with suction cups for engaging with an internal sheet of glass carried by said suction cup of said first carrier, and acutators for centering the glass sheet prior to an application of a butyl rubber bead in said first station.

6. The apparatus as claimed in claim 1, wherein said second carrier includes a vertically movable first suction cup mounted at said first end of said second carrier for engaging an external sheet of glass.

7. The apparatus as claimed in claim 6, wherein said second centering station includes a plurality of vertically movable push rods provided with suction cups for engaging an external sheet of glass transported by said first suction cup of said second carrier, and actuators for centering a sheet of glass engaged by said push rods in said second station.

* * * * *